(12) United States Patent
Weng

(10) Patent No.: US 6,441,996 B1
(45) Date of Patent: Aug. 27, 2002

(54) DEVICE FOR CLEANING MAGNETIC HEAD OF A DISK DRIVE

(76) Inventor: Jin-Sheng Weng, 3F., No. 41, Alley 17, Lane 468, Yung Chi Road, Taipei (TW)

( * ) Notice: Subject to any disclaimer, the term of this patent is extended or adjusted under 35 U.S.C. 154(b) by 0 days.

(21) Appl. No.: 09/433,643

(22) Filed: Nov. 3, 1999

(51) Int. Cl.[7] ........................... G11B 5/10; G11B 5/127; G11B 5/41
(52) U.S. Cl. ...................................... 360/128
(58) Field of Search ................................ 360/128, 110, 360/137; 369/292; 15/209.1, 214, 210.1

(56) References Cited

U.S. PATENT DOCUMENTS

| | | | | |
|---|---|---|---|---|
| 3,761,994 A | * | 10/1973 | Becht | 15/104.94 |
| 4,207,644 A | * | 6/1980 | Westran | 15/210.1 |
| 4,514,777 A | * | 4/1985 | Kudo | 360/128 |
| 4,622,617 A | * | 11/1986 | Fritsch | 15/210.1 |
| 5,235,485 A | * | 8/1993 | Martin | 360/128 |
| 5,329,511 A | * | 7/1994 | Sato | 369/71 |

FOREIGN PATENT DOCUMENTS

DE 2839722 A1 * 3/1980

* cited by examiner

Primary Examiner—Robert S. Tupper
(74) Attorney, Agent, or Firm—Pro-Techtor International Services

(57) ABSTRACT

A device for cleaning the magnetic head of a disk drive mainly formed from a lower plate having a notch at a front end thereof, an upper plate closed to the lower plate and having an opening at a front end thereof corresponding to the notch of the lower plate, a cleaning element disposed in the opening of the upper plate, and a shutter closing the opening of the upper plate to hold the cleaning element in place. A reflex induction element is mounted in the device on the lower plate. When the device is inserted into a disk drive, the magnetic head of the disk drive is induced by the reflex induction element to move outward and contact with the cleaning element via the notch and the opening. Dust and impurities on the magnetic head are therefore removed by the cleaning element.

3 Claims, 2 Drawing Sheets

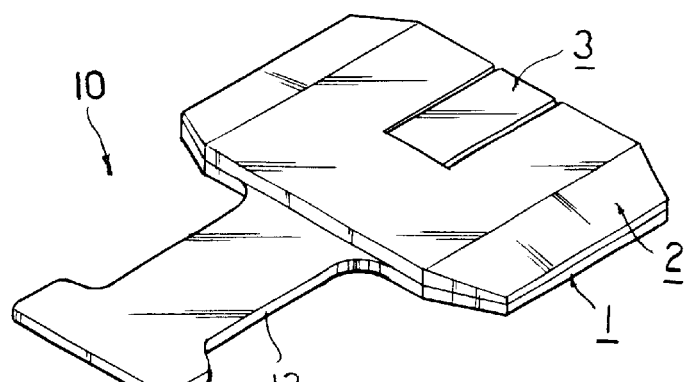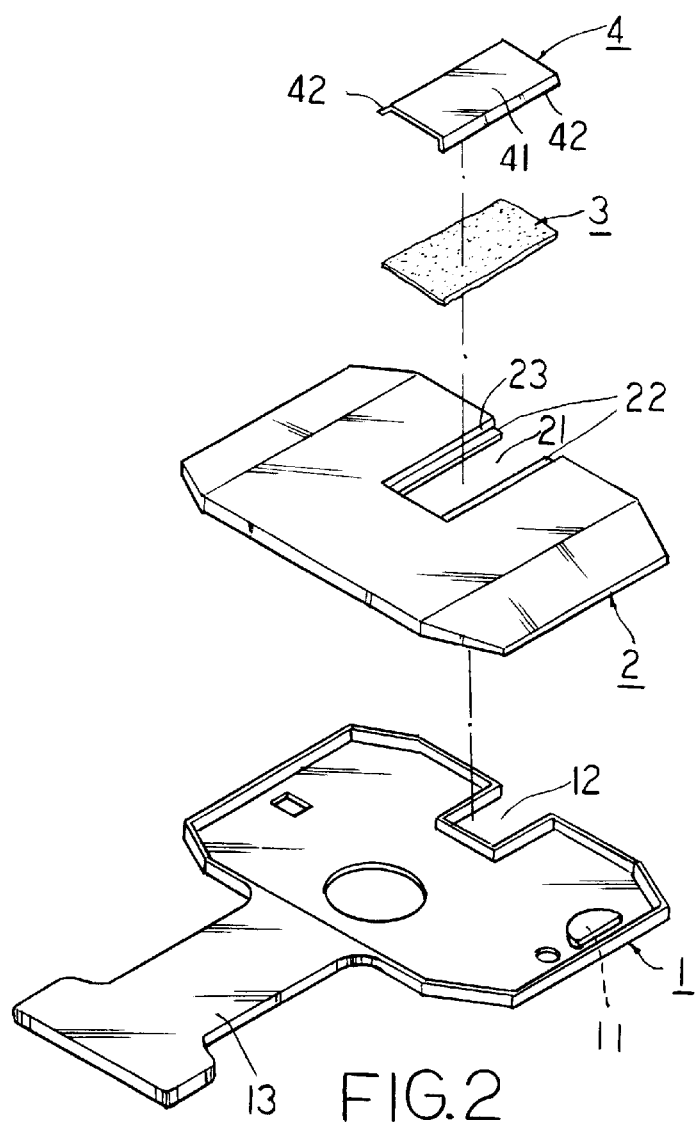

DEVICE FOR CLEANING MAGNETIC HEAD OF A DISK DRIVE

BACKGROUND OF THE INVENTION

The present invention relates to a device for cleaning magnetic head of a disk drive, and more particularly to a cleaning device for the magnetic head of a ZIP disk drive to effectively remove dust and impurities from the magnetic head and therefore thoroughly clean the same.

The ZIP disk drive is one type of portable disk drive for computers and is characterized by its high storage capacity and convenience for installation. Due to these advantages, the ZIP disk drive has been widely adopted for use. However, the ZIP disk drive is subject to the problem of dust that gradually adheres to and accumulates on the magnetic head of the disk drive to cause difficulties in read/write and storage functions. The magnetic head of the ZIP disk drive must therefore be cleaned at regular or irregular intervals with an effective cleaning device.

SUMMARY OF THE INVENTION

It is therefore a primary object of the present invention to provide a device for conveniently and effectively cleaning the magnetic head of a disk drive. The cleaning device provided by the present invention for this purpose mainly includes a lower plate having a notch at a front end thereof, an upper plate closed to the lower plate and having an opening at a front end thereof corresponding to the notch of the lower plate, a cleaning element disposed in the opening of the upper plate, and a shutter closing the opening of the upper plate to hold the cleaning element in place. A reflex induction element is mounted in the device on the lower plate. When the device is inserted into a disk drive, the magnetic head of the disk drive is induced by the reflex induction element to move outward and contact with the cleaning element via the notch and the opening. Dust and impurities on the magnetic head are therefore removed by the cleaning element.

BRIEF DESCRIPTION OF THE DRAWINGS

The detailed structure, the features, and the functions of the present invention may be best understood by referring to the following detailed description of preferred embodiments and the accompanying drawings, wherein FIG. 1 is an assembled perspective of the magnetic head cleaning device according to the present invention;

FIG. 2 is an exploded perspective of the magnetic head cleaning device of FIG. 1;

DETAILED DESCRIPTION OF THE PREFERRED EMBODIMENTS

Figure 3:
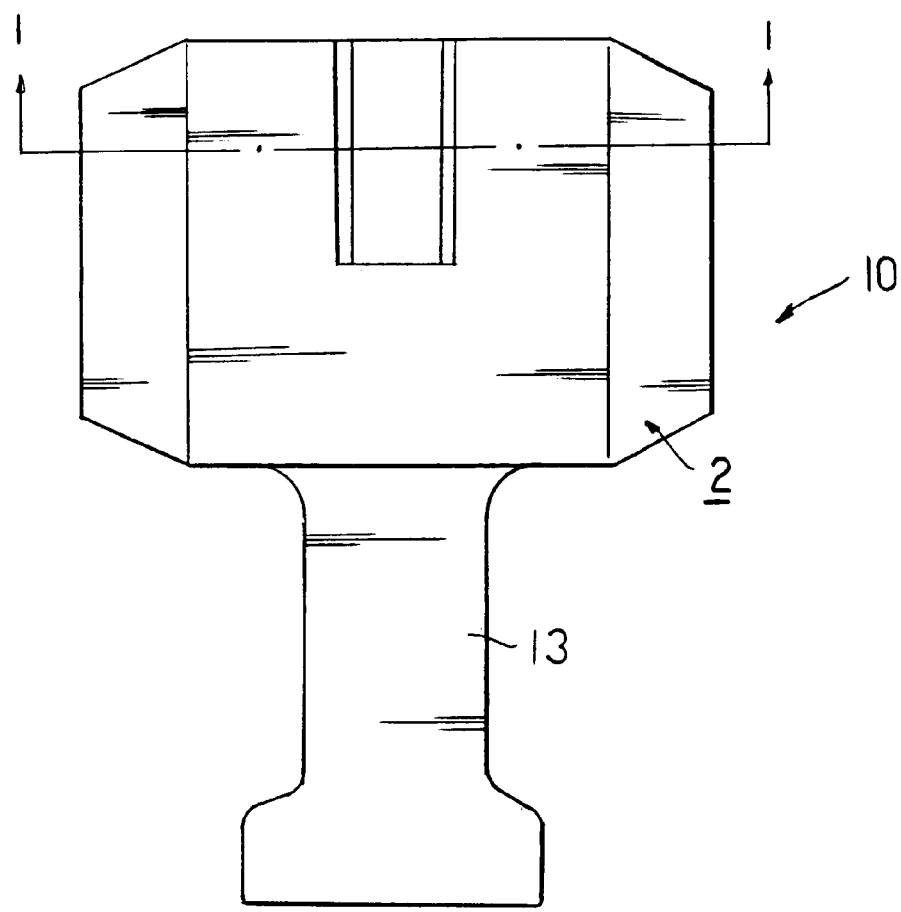
FIG. 3 is a plan view of the magnetic head cleaning device of FIG. 1.

Please refer to FIGS. 1 and 2 that are assembled and exploded perspective views, respectively, of a device 10 according to the present invention for cleaning a magnetic head of a disk drive. As shown, the device 10 mainly includes a lower plate 1, an upper plate 2, a cleaning element 3, and a shutter 4.

Figure 4:
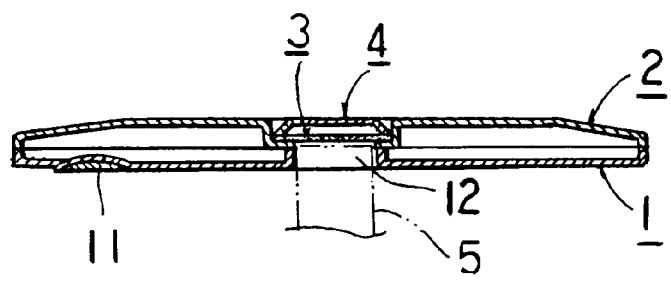
FIG. 4 is a sectional view taken on line 1—1 of FIG. 3.

Please also refer to FIGS. 3 and 4. The lower and the upper plates 1, 2 are closed to one another to provide a flat body. A reflex induction element 11 is mounted in the flat body on the lower plate 1 at a suitably determined point. When the device 10 is inserted into a disk drive (not shown), the reflex induction element 11 will induce a magnetic head 5 of the disk drive to move outward. The lower plate 1 is formed at a front end with a notch 12. When the magnetic head 5 moves outward, it will finally upward project from the notch 12. The lower plate 1 is also formed at a rear end with an extended handle portion 13 for a user to conveniently and comfortably holding the cleaning device 10 during a cleaning operation.

The upper plate 2 is formed at a front end with an inward extended longitudinal opening 21 corresponding to the notch 12 on the lower plate 1. The opening 21 is provided at its two longitudinal sides with two inward flanges 22. There is a height difference between a top surface of the upper plate 2 and the flanges 22, such that a step is formed between the upper plate 2 and each flange 22 and a recess 23 is provided on the upper plate 2.

The cleaning element 3 is disposed on the longitudinal opening 21 of the upper plate 2 to stretch between the two flanges 22. The shutter 4 is positioned in the recess 23 with its two lateral edges rested on the flanges 22, so that the cleaning element 3 is tightly clamped between the flanges 22 and the shutter 4. The shutter 4 includes a plane top 41 and two bevel edges 42 that extend downward and outward from two lateral sides of the plane top 41. The bevel edges 42 are slightly elastic and can therefore be slightly compressed for the shutter 4 to be easily positioned into the recess 23. Thereafter, the bevel edges 42 automatically expand to firmly press against two longitudinal sides of the opening 21 to hold the cleaning element 3 in place.

The cleaning device 10 of the present invention can be operated in the same manner as operating a general magnetic disk. The user may hold the device 10 at the handle portion 13 and insert a front end of the device 10 into the disk drive. At this point, the magnetic head 5 of the disk drive is induced by the reflex induction element 11 on the lower plate 1 to move outward and contact with the cleaning element 3 via the notch 12 and the longitudinal opening 21. The cleaning element 3 would then remove dust and any impurity from the magnetic head 5 to thoroughly clean the magnetic head 5.

A cleaning element 3 that has been used for a prolonged time may be replaced with a new one. To do so, simply sequentially remove the shutter 4 and the old cleaning element 3 from the recess 23, and then place a new and good cleaning element 3 in the recess 23 and close the opening 21 with the shutter 4 to hold the cleaning element 3 in place.

The device for cleaning the magnetic head of a disk drive provided by the present invention has simple but novel structure and is convenient for use and can therefore be widely and practically employed for domestic and industrial purposes.

What is claimed is:

1. A device for cleaning magnetic head of a disk drive, comprising:

a lower plate having a notch provided at a front end thereof and a reflex induction element mounted thereon at a suitably predetermined position;

an upper plate being closed to said lower plate to form a flat body, said upper plate having a longitudinal opening provided at a front end thereof corresponding to said notch on said lower plate, said longitudinal opening being provided along two lateral sides with inward projected flanges, and a height difference existing between a top surface of said upper plate and said flanges, so that a recess is defined in said opening;

a cleaning element being disposed in said longitudinal opening to stretch between said two inward projected flanges; and a shutter being positioned in said recess to clamp said cleaning element in place between said flanges and said shutter.

2. A device for cleaning magnetic head of a disk drive as claimed in claim 1, wherein said shutter includes a plane top and two bevel edges downward and outward extended from two longitudinal sides of said plane top, said bevel edges being slightly elastic and therefore allowing said shutter to be slightly inward compressed or outward expanded at two longitudinal sides thereof.

3. A device for cleaning magnetic head of a disk drive as claimed in claim 1, wherein said lower plate includes a rearward extended handle portion.

* * * * *